(12) United States Patent
Park et al.

(10) Patent No.: US 12,320,900 B2
(45) Date of Patent: Jun. 3, 2025

(54) APPARATUS AND METHOD FOR GENERATING DYNAMIC SAFETY ZONE OF MOBILE ROBOT

(71) Applicants: Yujin Robot Co., Ltd., Incheon (KR); Miele & Cie. KG, Gütersloh (DE)

(72) Inventors: Seong Ju Park, Incheon (KR); Dong Hyeon Seo, Incheon (KR); Seung Ho Jang, Incheon (KR); Min Chang, Incheon (KR); Yun Jib Kim, Incheon (KR); Chang Woo Kim, Incheon (KR)

(73) Assignees: Yujin Robot Co., Ltd., Incheon (KR); Miele & Cie. KG, Gütersloh (DE)

( * ) Notice: Subject to any disclaimer, the term of this patent is extended or adjusted under 35 U.S.C. 154(b) by 126 days.

(21) Appl. No.: 18/316,889

(22) Filed: May 12, 2023

(65) Prior Publication Data

US 2024/0075620 A1    Mar. 7, 2024

Related U.S. Application Data

(63) Continuation-in-part of application No. PCT/KR2021/016526, filed on Nov. 12, 2021.

(30) Foreign Application Priority Data

Nov. 12, 2020 (KR) .................. 10-2020-0151001
Nov. 10, 2021 (KR) .................. 10-2021-0153766

(Continued)

(51) Int. Cl.
*B25J 9/16*    (2006.01)
*B25J 11/00*   (2006.01)
(Continued)

(52) U.S. Cl.
CPC ........... *G01S 17/931* (2020.01); *B25J 9/1653* (2013.01); *B25J 9/1666* (2013.01); *B25J 9/1676* (2013.01);
(Continued)

(58) Field of Classification Search
CPC ..... G01S 17/931; B25J 9/1653; B25J 9/1666; B25J 9/1676; B25J 13/089; B25J 19/022;
(Continued)

(56) References Cited

U.S. PATENT DOCUMENTS 6,771,208 B2    8/2004  Lutter et al.
2005/0154503 A1 7/2005  Jacobs et al.
(Continued)

FOREIGN PATENT DOCUMENTS

KR   10-2008-0027675 A   3/2008
KR   10-2018-0061929 A   6/2018
(Continued)

OTHER PUBLICATIONS

International Search Report for PCT/KR2021/016526 by Korean Intellectual Property Office dated Feb. 18, 2022.
(Continued)

*Primary Examiner* — Adam R Mott
*Assistant Examiner* — Byron Xavier Kasper
(74) *Attorney, Agent, or Firm* — BROADVIEW IP LAW, PC

(57) ABSTRACT

A functional safety system of a robot according to an exemplary embodiment of the present disclosure can generate a safety zone which is a zone to sense whether an obstacle is present.

14 Claims, 17 Drawing Sheets

(30) Foreign Application Priority Data

Nov. 10, 2021 (KR) .................. 10-2021-0153767
Nov. 10, 2021 (KR) .................. 10-2021-0153768

(51) Int. Cl.

| | | |
|---|---|---|
| B25J 13/08 | (2006.01) | |
| B25J 19/02 | (2006.01) | |
| G01S 17/931 | (2020.01) | |
| G05D 1/00 | (2024.01) | |
| G05D 1/242 | (2024.01) | |
| G05D 1/622 | (2024.01) | |

(52) U.S. Cl.
CPC ........... *B25J 13/089* (2013.01); *B25J 19/022* (2013.01); *G05D 1/0214* (2013.01)

(58) Field of Classification Search
CPC ..... B25J 11/008; B25J 9/00; B25J 9/16; B25J 9/0003; B25J 9/163; B25J 11/0085; G05D 1/0214; G05D 2109/10; G05D 1/2424; G05D 1/637; G05D 2111/17; G05B 2219/39091; G05B 2219/40476; A47L 11/10

See application file for complete search history.

(56) References Cited

U.S. PATENT DOCUMENTS

| | | | |
|---|---|---|---|
| 2016/0313364 A1* | 10/2016 | Kawai | G01S 17/58 |
| 2017/0025019 A1 | 1/2017 | Pink et al. | |
| 2017/0144307 A1* | 5/2017 | Rublee | B25J 19/02 |
| 2018/0173223 A1* | 6/2018 | Doane | G05D 1/241 |
| 2018/0372875 A1 | 12/2018 | Juelsgaard et al. | |
| 2019/0161274 A1* | 5/2019 | Paschall, II | G05D 1/0246 |
| 2019/0262993 A1* | 8/2019 | Cole | B25J 9/1676 |
| 2019/0272671 A1 | 9/2019 | Zhang et al. | |
| 2020/0192341 A1* | 6/2020 | Weaver | G05D 1/0246 |
| 2021/0018927 A1* | 1/2021 | Ackerman | G05D 1/0268 |
| 2021/0157325 A1* | 5/2021 | Beller | B60W 60/001 |
| 2021/0213619 A1* | 7/2021 | Hong | A47L 9/2894 |

FOREIGN PATENT DOCUMENTS

| | | | | |
|---|---|---|---|---|
| KR | 10-2018-0099090 A | | 9/2018 | |
| KR | 10-1986919 B1 | | 6/2019 | |
| WO | WO-2021208225 A1 | * | 10/2021 | ............ A47L 11/305 |

OTHER PUBLICATIONS

Office Action for U.S. Appl. No. 18/316,927 by United States Patent and Trademark Office dated Apr. 8, 2025.

* cited by examiner

APPARATUS AND METHOD FOR GENERATING DYNAMIC SAFETY ZONE OF MOBILE ROBOT

CROSS-REFERENCE TO RELATED APPLICATIONS

This application is a Continuation-in-part of pending PCT International Application No. PCT/KR2021/016526 filed on Nov. 12, 2021, which claims priority to Korean Patent Application No. 10-2020-0151001 filed on Nov. 12, 2020, Korean Patent Application No. 10-2021-0153766 filed on Nov. 10, 2021, Korean Patent Application No. 10-2021-0153767 filed on Nov. 10, 2021, and Korean Patent Application No. 10-2021-0153768 filed on Nov. 10, 2021, in the Korean Intellectual Property Office, the entire contents of which are hereby incorporated by references in its entirety.

BACKGROUND

Field

The present disclosure relates to a functional safety system of a robot, and more particularly, to an apparatus and a method for generating a dynamic safety zone of a mobile robot which generate a safety zone which is a zone to sense whether there is an obstacle.

Description of the Related Art

When a dynamic safety zone of a robot is generated in the related art, a user receives and stores a shape of a static zone at every speed designated by a user and then if a speed reaches a corresponding speed, it is changed to a zone stored by the user to inspect whether there is an obstacle in the corresponding zone and stop. By doing this, the safety is ensured according to a number and shapes of zones according to a speed designated by the user.

As a traveling direction of the robot is diversified, the number of zones according to the speed needs to be increased as many as the traveling directions so that a method of directly inputting the safety zone by the user has limitations according to the number of zones. A performance level d (PL-d) LiDAR (light detection and ranging) which uses a dynamic safety zone limits a number of safety zones and a budget model may inputs up to six zones and a high-end model may input up to 32 zones.

As on example, a robot using a mecanum wheel which requires various directions travels in both the x-axis and the y-axis and travels while rotating. Therefore, it is difficult for the user to designate an appropriate safety zone according to the speed and the direction for the dynamic driving. Further, as the speed is subdivided to increase the density between zones, the number of zones which need to be input by the user is also increased so that the larger the number of zones, the higher the risk due to the user fault.

FIG. 1 is a view for explaining a method of generating a safety zone of the related art.

That is, as illustrated in FIG. 1, according to the safety zone generating method of the related art, in a state in which the user matches and stores the speed and the safety zone, when the corresponding condition is satisfied, the safety zone is changed so that the number of safety zones is limited. The higher the density between the safety zones, the larger the number of safety zones and the higher the risk of the user fault by the user.

SUMMARY

An object to be achieved by the present disclosure is to provide an apparatus and a method for generating a dynamic safety zone of a mobile robot which variably generate a safety zone required for a functional safety of a mobile robot according to an appearance and a speed of the mobile robot.

Other and further objects of the present disclosure which are not specifically described can be further considered within the scope easily deduced from the following detailed description and the effect.

In order to achieve the above-described objects, according to an aspect of the present disclosure, a dynamic safety zone generating apparatus of a mobile robot includes an information acquiring unit which acquires a movement direction and a movement speed of a mobile robot; and a safety zone generating unit which dynamically generates a safety zone for the mobile robot based on at least one of shape information of the mobile robot, a movement direction of the mobile robot acquired by the information acquiring unit, and a movement speed of the mobile robot acquired by the information acquiring unit.

Here, the safety zone generating unit acquires a future predicted position of the mobile robot based on the movement direction and the movement speed of the mobile robot and dynamically generates a safety zone of the mobile robot based on the shape information of the mobile robot and the future predicted location of the mobile robot.

Here, the dynamic safety zone generating unit acquires the movement speed of the x-axis direction and the movement speed of the y-axis direction based on the movement direction and the movement speed of the mobile robot, acquires the future predicted x-axis location based on the movement speed of the x-axis direction, acquires the future predicted y-axis location of the mobile robot based on the movement speed of the y-axis direction, and acquires a future predicted location of the mobile robot based on the future predicted x-axis location and the future predicted y-axis location.

Here, the safety zone generating unit acquires a default safety zone based on the shape information of the mobile robot and dynamically generates a safety zone for the mobile robot based on the default safety zone and the future predicted location of the mobile robot.

Here, the safety zone generating unit acquires front, rear, left, and right distances with respect to the center point of the mobile robot based on the shape information of the mobile robot and acquires a default safety zone formed of four vertices based on the center point of the robot and the front, rear, left, and right distances.

Here, the safety zone generating unit varies the front, rear, left, and right distances according to the default safety zone based on the future predicted location of the mobile robot to dynamically generate the safety zone for the mobile robot.

Here, the safety zone generating unit acquires a plurality of sub safety zones by varying the front, rear, left, and right distances according to the default safety zone plural times, based on the current location of the mobile robot and the future predicted location of the mobile robot and dynamically generates the safety zone for the mobile robot based on the plurality of sub safety zones.

Here, the safety zone generating unit dynamically generates a safety zone for the mobile robot in the unit of predetermined cycle.

Here, the movement direction of the mobile robot is one of a traveling direction according to a straight movement of the mobile robot, a traveling direction according to the rotation of the mobile robot, and a traveling direction when the rotation and the straight movement of the mobile robot are simultaneously generated, the straight movement of the mobile robot is one of a straight movement on the x-axis, a straight movement on the y-axis, and a diagonal movement on the x-axis and the y-axis, and the rotation of the mobile robot is one of the rotational movement to the left side and the rotational movement to the right side.

Here, the safety zone generating unit generates the safety zone including a plurality of sub safety areas and speed ranges of a mobile robot required by the sub safety areas are different from each other.

Here, the plurality of sub safety areas includes a first sub safety area, a second sub safety area, and a third sub safety area and a first speed range required by the first sub safety area does not overlap a second speed range required by the second sub safety area and is set to be higher than the second speed range.

Here, a third speed range required by the third sub safety area is set to be smaller than the second speed range and when the third sub safety area is in contact with a surface of a body of the mobile robot, the third speed range includes a speed value of 0.

Here, the safety zone generating unit includes a processor and further includes a neural network processor including a machine learning model which is trained in advance to improve a processing speed and an accuracy related to the safety zone.

Here, the processor finally determines an attribute (size, shape, location) of the safety area in consideration of motion information of the mobile robot, environment information acquired from the sensor, or collision prediction information for collision possibility between the mobile robot and the obstacle transmitted from the collision probability prediction model.

In order to achieve the above-described objects, according to an aspect of the present disclosure, a dynamic safety zone generating method of a mobile robot includes: acquiring a movement direction and a movement speed of a mobile robot; and dynamically generating a safety zone for the mobile robot based on at least one of shape information of the mobile robot, a movement direction of the mobile robot, and a movement speed of the mobile robot.

Here, the dynamically generating of a safety zone is configured by acquiring a future predicted position of the mobile robot based on the movement direction and the movement speed of the mobile robot and dynamically generating a safety zone of the mobile robot based on the shape information of the mobile robot and the future predicted location of the mobile robot.

Here, the dynamically generating of a safety zone is configured by acquiring a default safety zone based on the shape information of the mobile robot and dynamically generating a safety zone for the mobile robot based on the default safety zone and the future predicted location of the mobile robot.

According to the apparatus and the method for generating a dynamic safety zone of a mobile robot according to the exemplary embodiment of the present disclosure, an expected location of a mobile robot can be calculated according to a speed/direction by shape information and direction/speed information of a mobile robot without inputting the safety zone by the user and a dynamic safety zone is automatically generated to be used for all mobile robots mounted with various wheels, such as a diff wheel or a Mecanum wheel.

Further, the safety zones are automatically generated in all directions without directly inputting the safety zone by the user so that the safety function for the density between the safety zones and omni-directions can be performed and the user fault caused by the user input may be significantly reduced.

The effects of the present invention are not limited to the technical effects mentioned above, and other effects which are not mentioned can be clearly understood by those skilled in the art from the following description.

DETAILED DESCRIPTION OF THE EMBODIMENT

Figure 1:
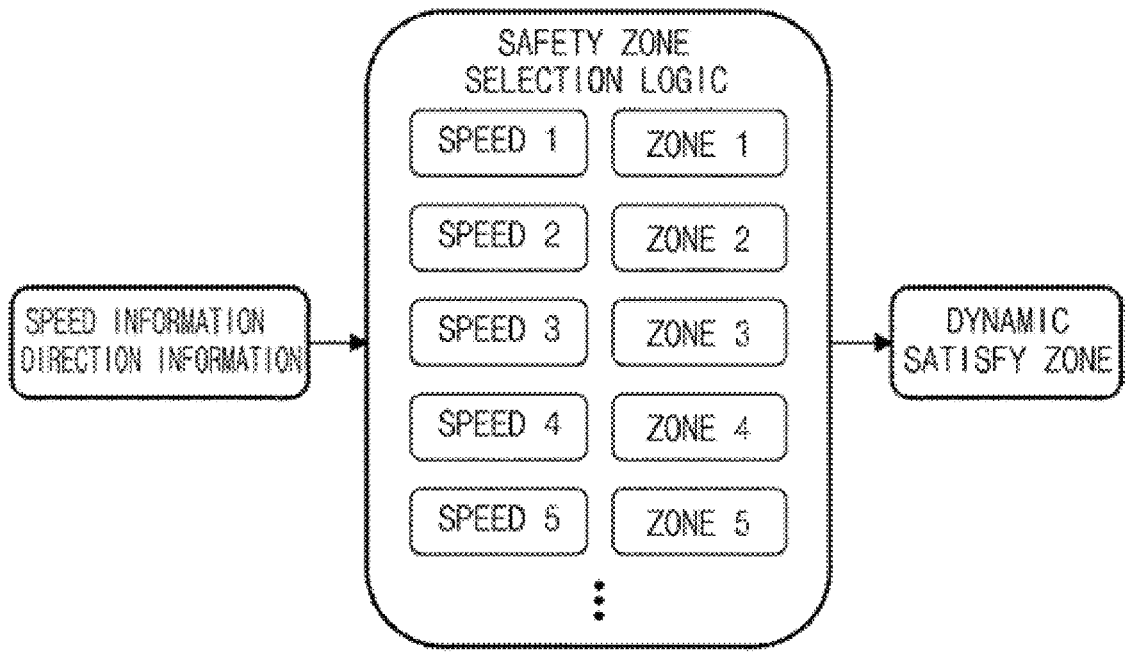
FIG. 1 is a view for explaining a method of generating a safety zone of the related art.

Hereinafter, embodiments of the present invention will be described in detail with reference to the accompanying drawings. Advantages and features of the present disclosure, and methods for accomplishing the same will be more clearly understood from exemplary embodiments described below with reference to the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals generally denote like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may be referred to as a second component, and similarly, a second component may be referred to as a first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

The term "~unit" used in the specification refers to a software or hardware component such as a field programmable gate array (FPGA) or an ASIC and "~unit" performs some functions. However, "~unit" is not limited to the software or the hardware. "~unit" may be configured to be in an addressable storage medium or may be configured to reproduce one or more processors. Accordingly, as an example, "~unit" includes components such as software components, object oriented software components, class components, and task components, processes, functions, attributes, procedures, subroutines, segments of a program code, drivers, a firmware, a microcode, a circuit, data, database, and data structures. A function which is provided in the components and "~units" may be combined with a smaller number of components and "~units" or divided into additional components and "~units".

Hereinafter, a functional safety system of a robot according to the present disclosure will be described in detail with reference to the accompanying drawing.

First, an apparatus for generating a dynamic safety zone of a mobile robot according to an exemplary embodiment of the present disclosure will be described with reference to FIGS. 3 to 7.

Figure 2:
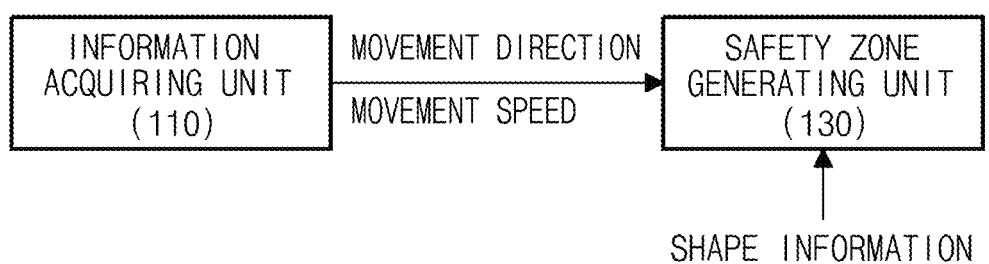
FIG. 2 is a block diagram for explaining an apparatus of generating a dynamic safety zone of a mobile robot according to an exemplary embodiment of the present disclosure.
Figure 3:
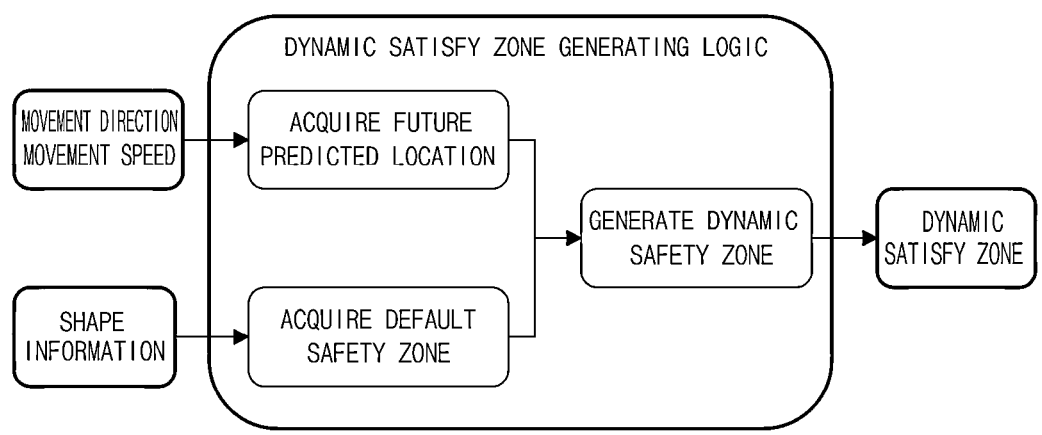
FIG. 3 is a view for explaining a process of generating a dynamic safety zone according to an exemplary embodiment of the present disclosure.
Figure 4:
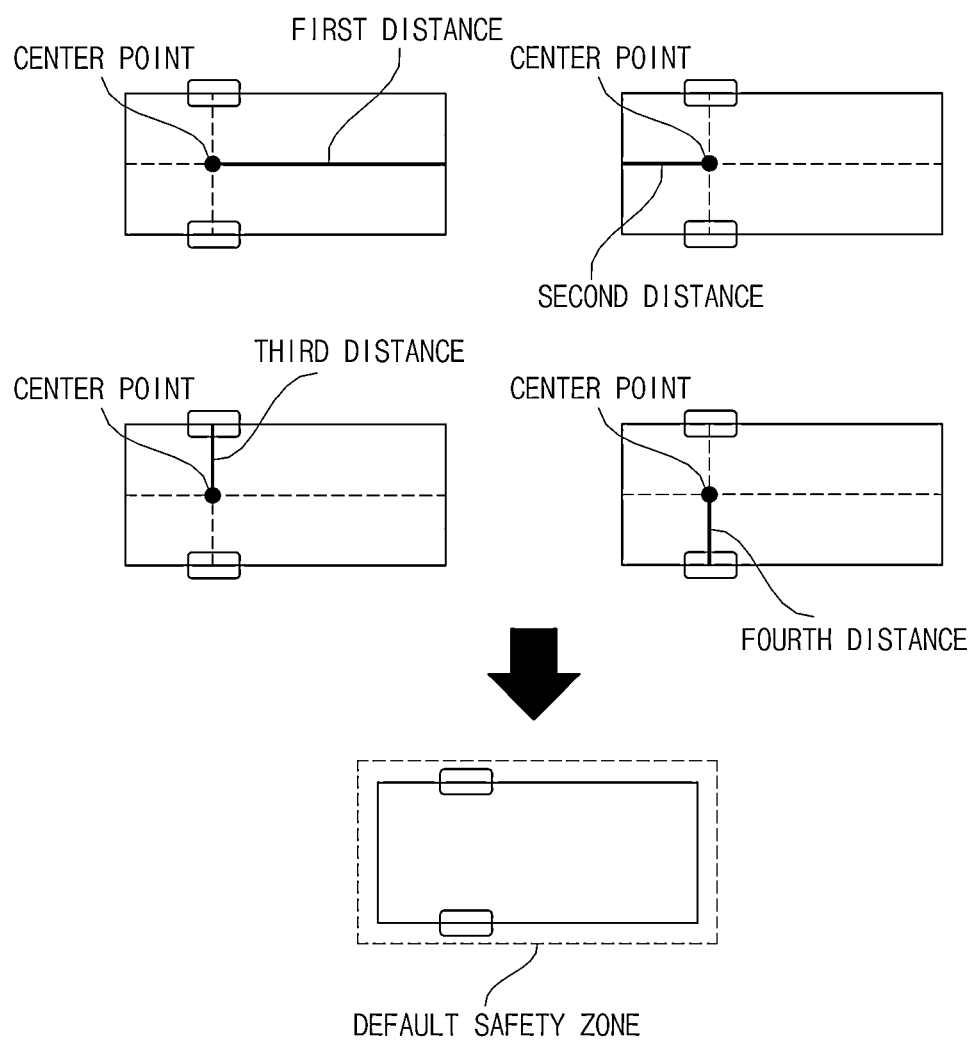
FIG. 4 is a view for explaining an operation of acquiring a default safety zone according to an exemplary embodiment of the present disclosure.
Figure 5:
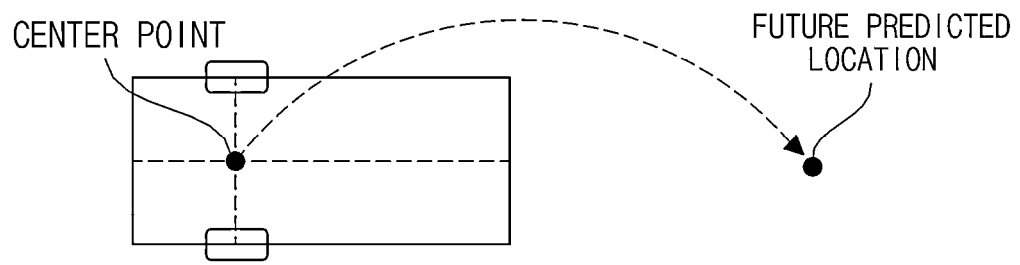
FIG. 5 is a view for explaining an operation of acquiring a future predicted location according to an exemplary embodiment of the present disclosure.
Figure 6:
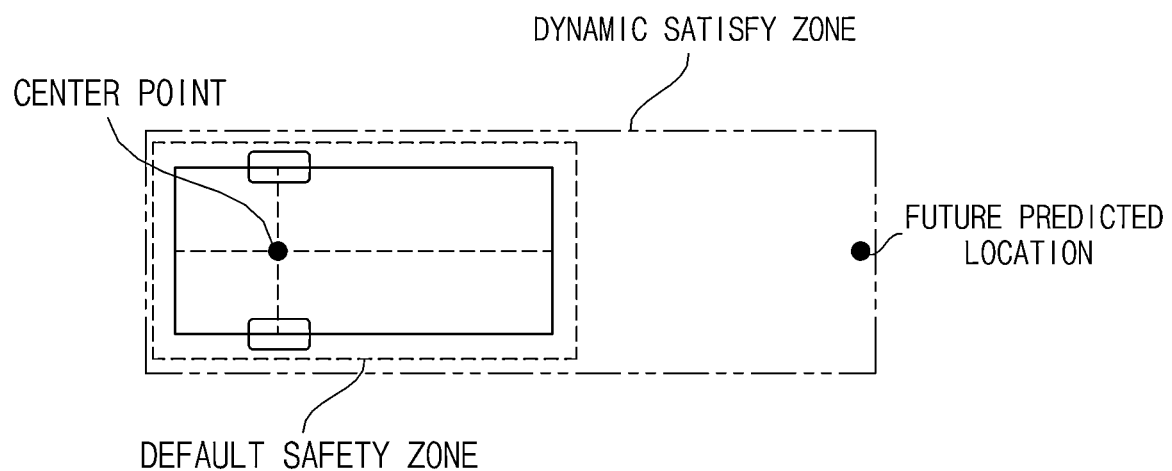
FIG. 6 is a view for explaining an operation of generating a dynamic safety zone according to an exemplary embodiment of the present disclosure.

FIG. 2 is a block diagram for explaining an apparatus of generating a dynamic safety zone of a mobile robot according to an exemplary embodiment of the present disclosure, FIG. 3 is a view for explaining a process of generating a dynamic safety zone according to an exemplary embodiment of the present disclosure, FIG. 4 is a view for explaining an operation of acquiring a default safety zone according to an exemplary embodiment of the present disclosure, FIG. 5 is a view for explaining an operation of acquiring a future predicted location according to an exemplary embodiment of the present disclosure, and FIG. 6 is a view for explaining an operation of generating a dynamic safety zone according to an exemplary embodiment of the present disclosure.

Referring to FIG. 2, an apparatus 100 for generating a dynamic safety zone of a mobile robot according to an exemplary embodiment of the present disclosure (hereinafter, referred to as a "dynamic safety zone generating apparatus") variably generates a safety zone required for the functional safety of the mobile robot according to an appearance and a speed of the mobile robot.

Here, the present disclosure is applicable to household cleaning robots, public building cleaning robots, logistics robots, service robots, as well as industrial robots.

That is, the dynamic safety zone generating apparatus 100 according to the present disclosure is free from a method having a limitation for a number of safety zones and a high risk of a user fault due to a method of directly inputting a safety zone by a user according to a speed and a direction of the mobile robot, which is a method according to a related art, and calculates a predicted location of a mobile robot according to a speed/direction by shape information and direction/speed information of the mobile robot without inputting a safety zone by a user and automatically generates a dynamic safety zone to be used for all mobile robots mounted with various wheels such as a diff wheel and a Mecanum wheel. Accordingly, unlike a safety zone generating method of the related art in which a safety zone set by the user is not selectively changed, according to the present disclosure, the safety zone is automatically generated for all directions without directly inputting the safety zone by a user so that the safety function for the density between the safety zones and omni-directions may be performed and a user fault by the user input may be significantly reduced.

In the meantime, the dynamic safety zone generating apparatus 100 according to the present disclosure is loaded in a mobile robot to dynamically generate a safety zone based on information acquired from the sensor mounted in the mobile robot. The dynamic safety zone generating apparatus 100 according to the present disclosure is loaded in a server which remotely manages the mobile robot by wireless communication to dynamically generate the safety zone of the mobile robot based on the information provided from the mobile robot and provide information about the generated safety zone to the mobile robot.

To this end, the dynamic safety zone generating apparatus 100 includes an information acquiring unit 110 and a safety zone generating unit 130.

The information generating unit 110 acquires a movement direction and a movement speed of the mobile robot.

Here, the movement direction of the mobile robot refers to one of a traveling direction according to a straight movement of the mobile robot, a traveling direction according to the rotation of the mobile robot, and a traveling direction when the rotational movement and the straight movement of the mobile robot are simultaneously generated.

The straight movement of the mobile robot refers to one of a straight movement on the x-axis, a straight movement on the y-axis, and a diagonal movement on the x-axis and the y-axis.

The rotation of the mobile robot refers to one of the rotational movement to the left side and the rotational movement to the right side.

The safety zone generating unit 130 dynamically generates a safety zone for the mobile robot based on at least one of shape information of the mobile robot, a movement direction of the mobile robot acquired by the information acquiring unit 110, and a movement speed of the mobile robot acquired by the information acquiring unit 110.

At this time, the safety zone generating unit 130 dynamically generates the safety zone for the mobile robot in the unit of predetermined cycles. The safety zone generating unit 130 dynamically generates the safety zone of the mobile robot when at least one of the movement direction and the movement speed of the mobile changes.

To be more specific, the safety zone generating unit 130 acquires a future predicted position of the mobile robot based on the movement direction and the movement speed of the mobile robot. For example, as illustrated in FIG. 5, the safety zone generating unit 130 may acquire a future location of the mobile robot to be predicted with respect a current center location of the mobile robot, based on the movement direction and the movement speed of the mobile robot.

That is, the safety zone generating unit 130 may acquire the movement speed of the x-axis direction and the movement speed of the y-axis direction based on the movement direction and the movement speed of the mobile robot. The safety zone generating unit 130 may acquire a future predicted x-axis location of the mobile robot based on the movement speed of the x-axis direction and a future predicted y-axis location of the mobile robot based on the movement speed of the y-axis direction. The safety zone generating unit 130 acquires the future predicted location of the mobile robot based on the future predicted x-axis location and the future predicted y-axis location.

For example, the safety zone generating unit 130 acquires the future predicted location of the mobile robot by means of the following Equation 1.

$$\text{future location·}x=\text{speed·}x^*(\text{response time}+\text{braking distance}+\text{margin distance}) \text{ future location·}y=\text{speed·}y^*(\text{response time}+\text{braking distance}+\text{margin distance})$$ [Equation 1]

Here, future location·x indicates the future predicted x-axis location and future location·y indicates the future predicted y-axis location. speed·x indicates a movement speed of the x-axis direction of the mobile robot and speed·y indicates a movement speed of the y-axis direction of the mobile robot. braking distance indicates a distance required to stop the mobile robot and is set in advance according to the speed of the mobile robot. margin distance indicates a margin distance which is set in advance for the safety of the mobile robot. response time is a response time of a sensor mounted in the mobile robot and is acquired by the following Equation 2.

$$\text{response time}=(\text{sensor scanning time}^*\text{sampling count})+\text{communication delay}+\text{margin response time}$$ [Equation 2]

Here, sensor scanning time indicates a scanning time of the sensor mounted in the mobile robot. sampling count indicates a number of samplings of the sensor mounted in the mobile robot. communication delay indicates a communication delay time of the sensor mounted in the mobile robot. margin response time indicates a margin response time which is set in advance for exact measurement of the sensor mounted in the mobile robot.

The safety zone generating unit 130 may dynamically generate a safety zone for the mobile robot based on the shape information of the mobile robot and the future predicted location of the mobile robot. Here, the shape information of the mobile robot refers to information about the appearance of the robot.

That is, the safety zone generating unit 130 may acquire a default safety zone based on the shape information of the mobile robot and dynamically generate a safety zone for the mobile robot based on the default safety zone and the future predicted location of the mobile robot.

At this time, the safety zone generating unit 130 acquires front, rear, left, and right distances with respect to the center point of the mobile robot based on the shape information of the mobile robot and acquires a default safety zone formed of four vertices based on the center point of the robot and the front, rear, left, and right distances. For example, as illustrated in FIG. 4, the safety zone generating unit 130 acquires a first distance (a front side distance), a second distance (a rear side distance), a third distance (a left side distance), and a fourth distance (a right side distance) with respect to the center point of the mobile robot and acquires a default safety zone based on the acquired first to fourth distances.

Further, the safety zone generating unit 130 varies the front, rear, left, and right distances according to the default safety zone based on the future predicted location of the mobile robot to dynamically generate the safety zone for the mobile robot. For example, as illustrated in FIG. 6, the safety zone generating unit 130 dynamically generates the safety zone by referring to the future predicted location of the mobile robot based on the default safety zone with respect to the current center position of the mobile robot. At this time, the distance of the safety zone is acquired by the following Equation 3.

$$\text{zone distance}=\text{speed}^*\text{response time}+\text{braking distance}+\text{margin distance}$$ [Equation 3]

Here, speed indicates a movement speed of the mobile robot. Response time is a response time of a sensor mounted in the mobile robot and is acquired by the above Equation 2. braking distance indicates a distance required to stop the mobile robot and is set in advance according to the speed of the mobile robot. margin distance indicates a margin distance which is set in advance for the safety of the mobile robot.

At this time, the safety zone generating unit 130 acquires a plurality of sub safety zones by varying the front, rear, left, and right distances according to the default safety zone plural times, based on the current location of the mobile robot and the future predicted location of the mobile robot and dynamically generates the safety zone for the mobile robot based on the plurality of sub safety zones. For example, the safety zone generating unit 130 acquires a sub safety zone in every predetermined distance unit, by dividing a path along which the mobile robot moves from a start point to a target time into a predetermined distance unit with the current location of the mobile robot as the start point and the future predicted location of the mobile robot as the target point and dynamically generates the safety zone for the mobile robot by overlapping the plurality of acquired sub safety zones.

Now, an example of generating a dynamic safety zone according to the first exemplary embodiment of the present disclosure will be described with reference to FIGS. 7 to 12.

Figure 7:
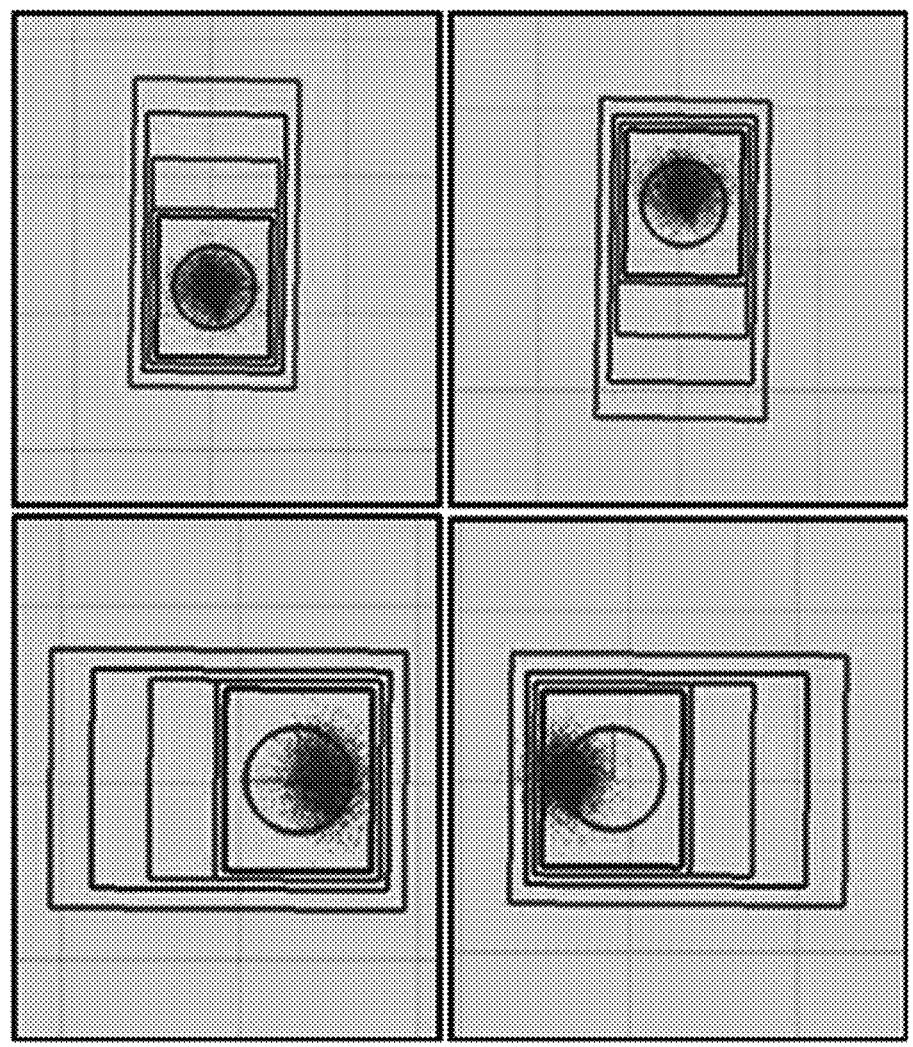
FIG. 7 is a view for explaining an example of generating a dynamic safety zone according to an exemplary embodiment of the present disclosure to illustrate a straight movement on one axis.
Figure 8:
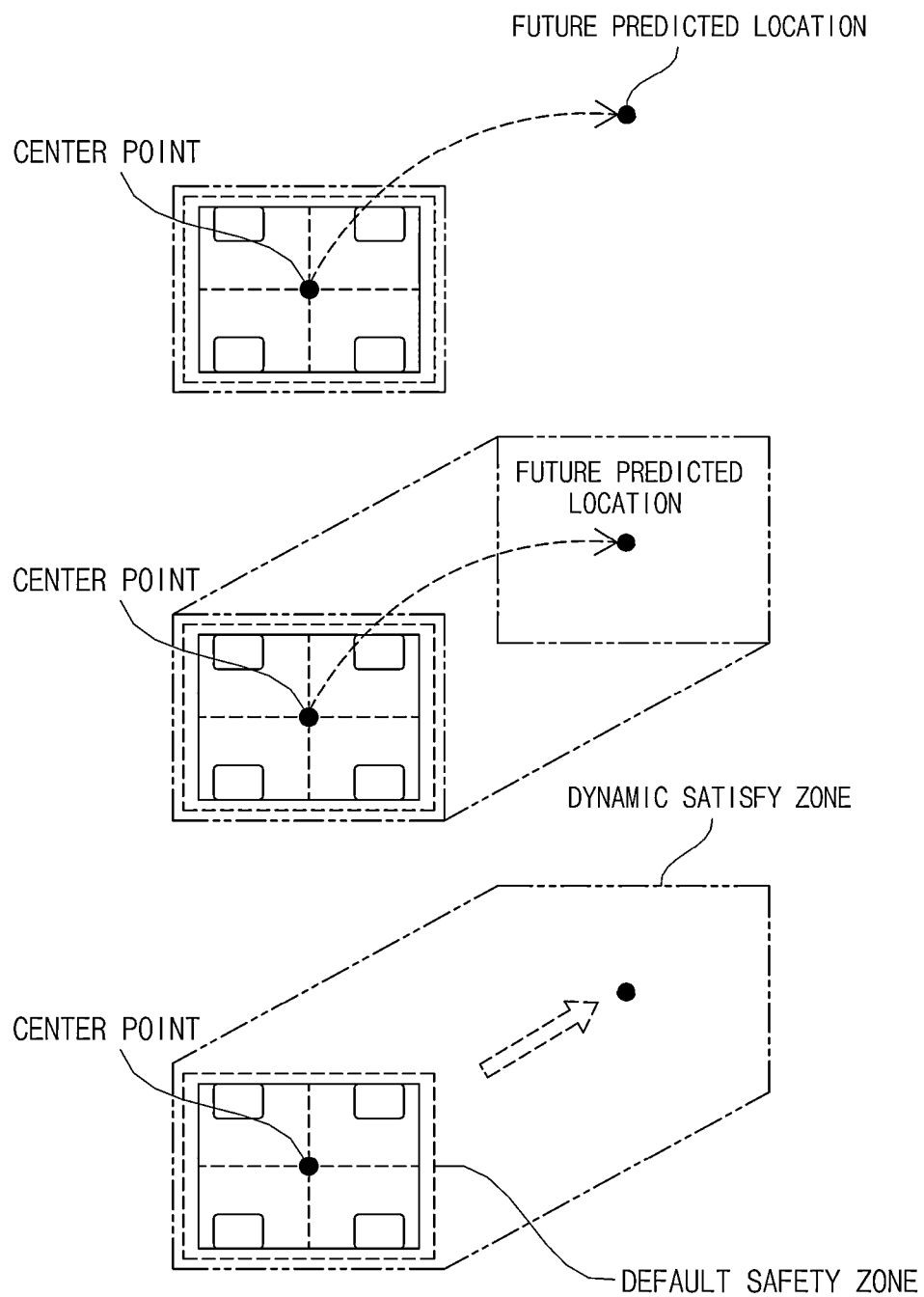
FIG. 8 is a view for explaining an operation of generating a dynamic safety zone for diagonal movement according to an exemplary embodiment of the present disclosure.
Figure 9:
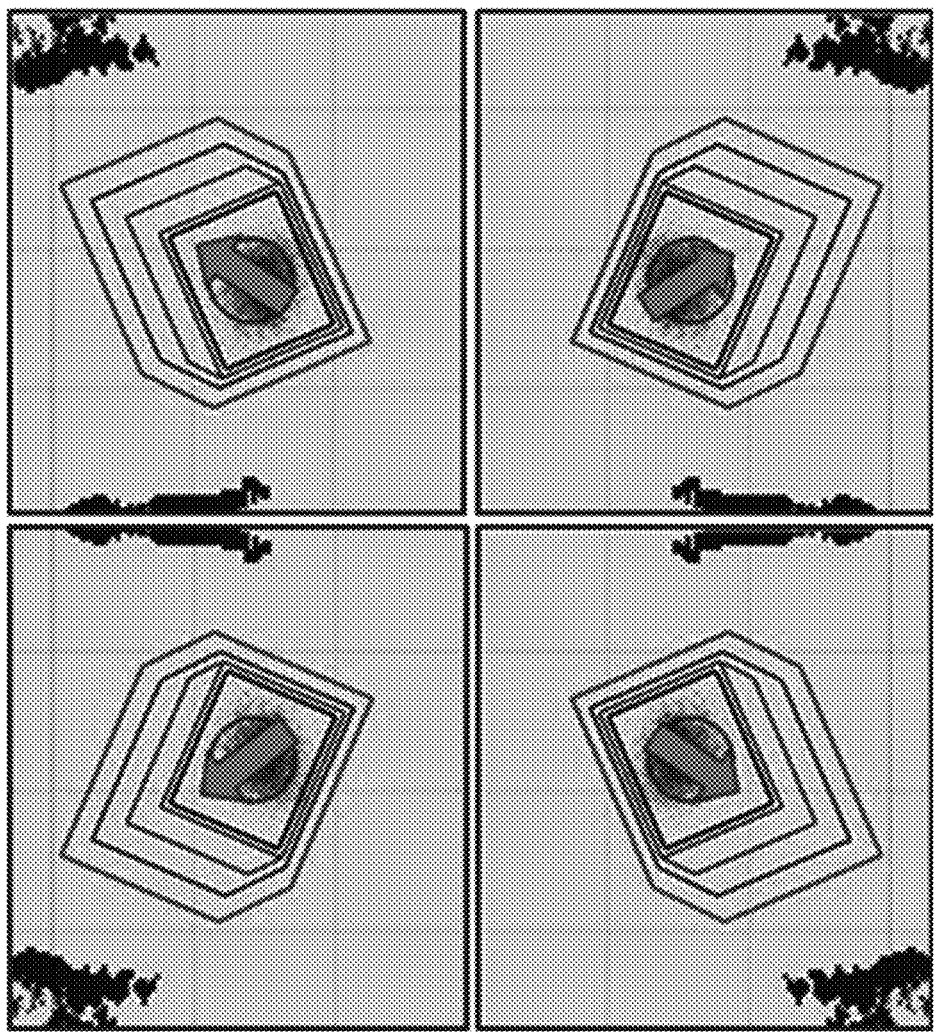
FIG. 9 is a view for explaining an example of generating a dynamic safety zone according to an exemplary embodiment of the present disclosure to illustrate a diagonal movement on an x-axis and a y-axis.
Figure 10:
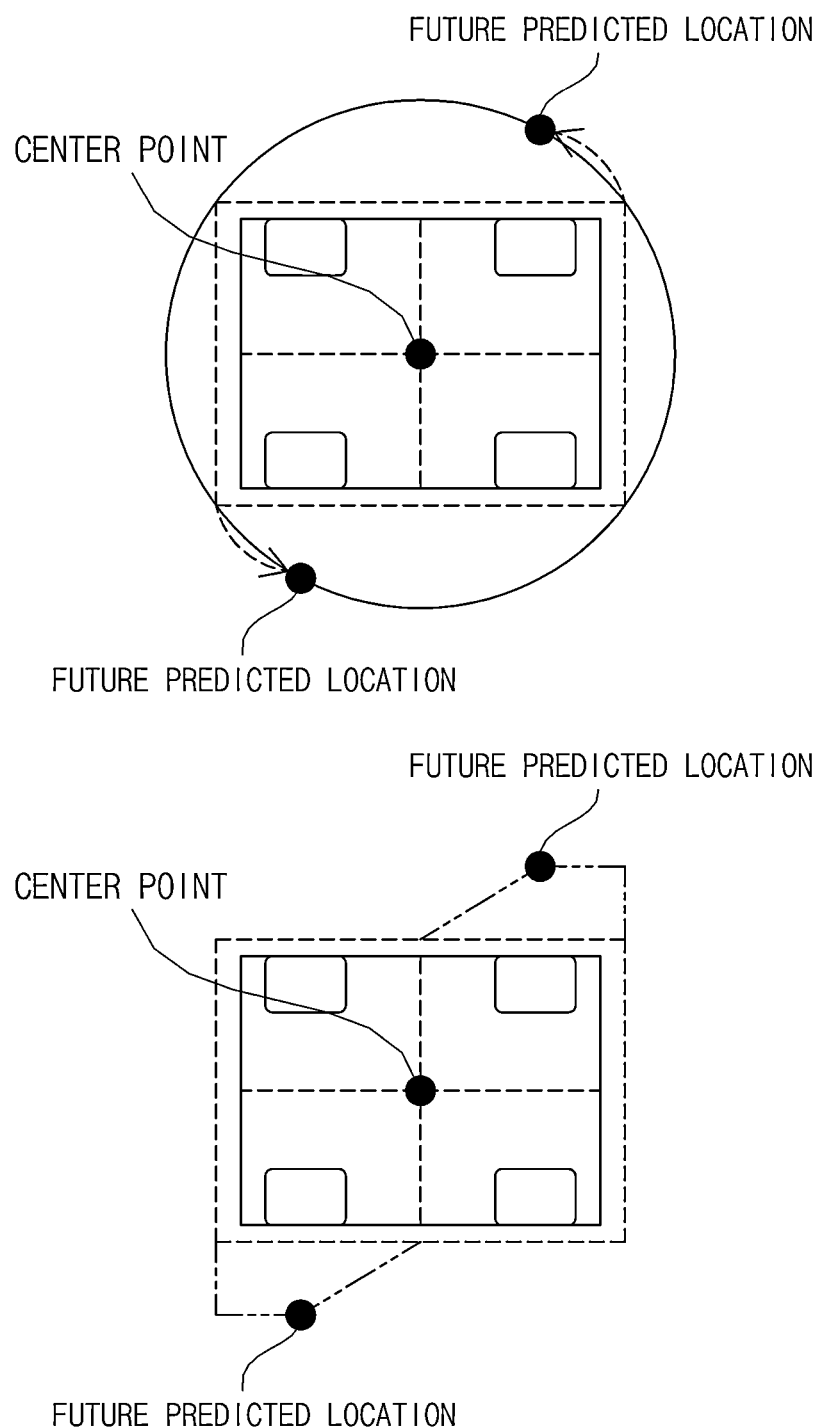
FIG. 10 is a view for explaining an operation of generating a dynamic safety zone of rotational movement according to an exemplary embodiment of the present disclosure.
Figure 11:
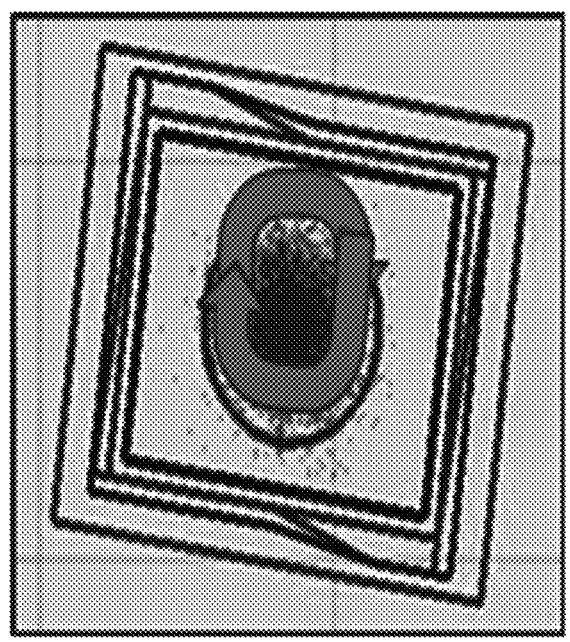
FIG. 11 is a view for explaining an example of generating a dynamic safety zone according to an exemplary embodiment of the present disclosure to illustrate a rotational movement.
Figure 12:
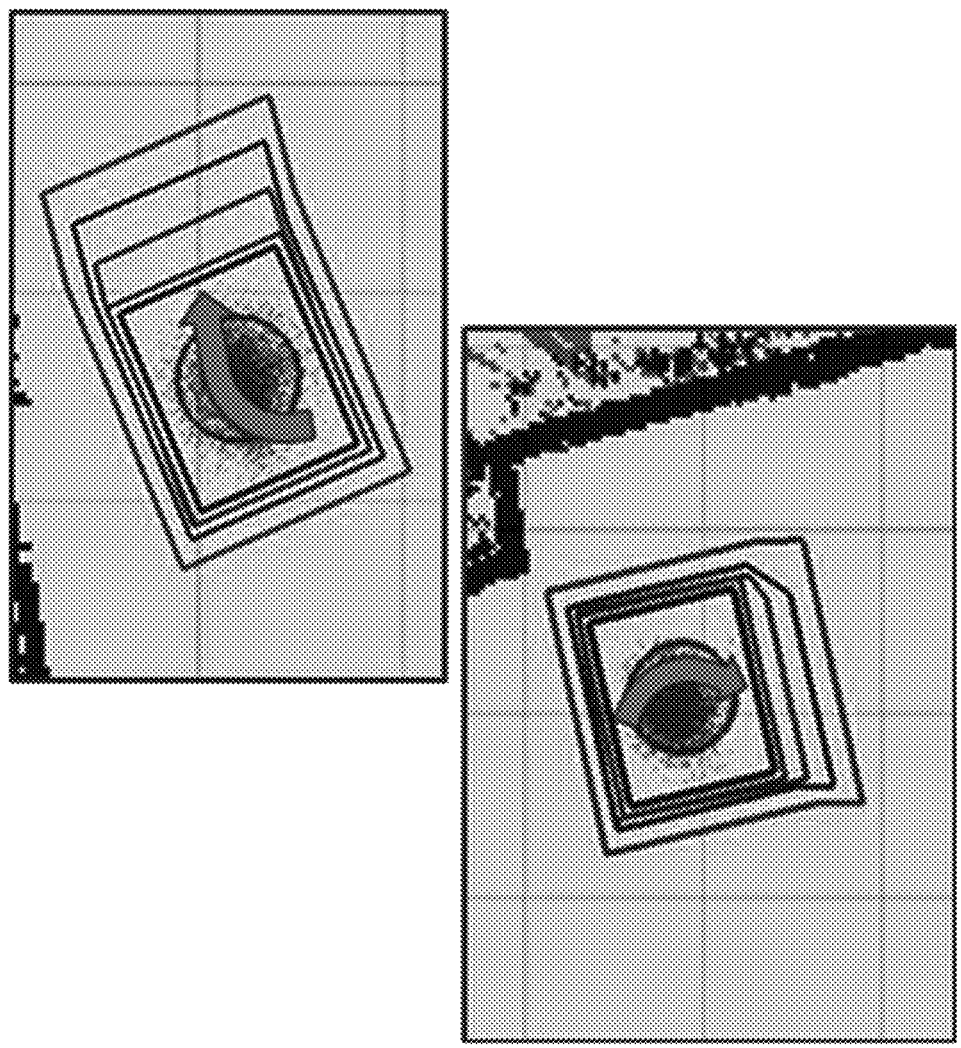
FIG. 12 is a view for explaining an example of generating a dynamic safety zone according to an exemplary embodiment of the present disclosure to illustrate a case in which a rotational movement and a straight movement simultaneously occur.

FIG. 7 is a view for explaining an example of generating a dynamic safety zone according to an exemplary embodiment of the present disclosure to illustrate a straight movement on one axis, FIG. 8 is a view for explaining an operation of generating a dynamic safety zone for diagonal movement according to an exemplary embodiment of the present disclosure, FIG. 9 is a view for explaining an example of generating a dynamic safety zone according to an exemplary embodiment of the present disclosure to illustrate a diagonal movement on an x-axis and a y-axis, FIG. 10 is a view for explaining an operation of generating a dynamic safety zone of rotational movement according to an exemplary embodiment of the present disclosure, FIG. 11 is a view for explaining an example of generating a dynamic safety zone according to an exemplary embodiment of the present disclosure to illustrate a rotational movement, and FIG. 12 is a view for explaining an example of generating a dynamic safety zone according to an exemplary embodiment of the present disclosure to illustrate a case in which a rotational movement and a straight movement simultaneously occur.

Referring to FIG. 7, the faster the speed, the longer the length of the safety zone which is dynamically generated and the slower the speed, the smaller the safety zone. However, the safety zone which is dynamically generated should not be smaller than the shape of the mobile robot, that is, the default safety zone.

Referring to FIGS. 8 and 9, when the mobile robot simultaneously moves to the x-axis and the y-axis, the mobile robot diagonally travels and the safety zone is dynamically and automatically generated so that the mobile robot does not collide with the obstacle during the diagonal traveling.

Referring to FIGS. 10 and 11, a shape of the safety zone which is dynamically generated according to the rotation direction of the mobile robot is changed so that when the mobile robot rotates to the right side, a upper right end and an upper left end which are likely to collide become longer and when the mobile robot rotates to the left side, the upper left end and the lower right end may become longer.

Referring to FIG. 12, when the rotational movement and the straight movement of the mobile robot are simultaneously generated so that there are a straight movement speed and a rotation speed simultaneously, a safety zone in which a rotational value is added based on a value obtained from the future predicted location of the mobile robot is generated and all the safety zones are automatically determined and changed according to the speed and the direction.

Now, a method for generating a dynamic safety zone of a mobile robot according to an exemplary embodiment of the present disclosure will be described with reference to FIG. 13.

Figure 13:
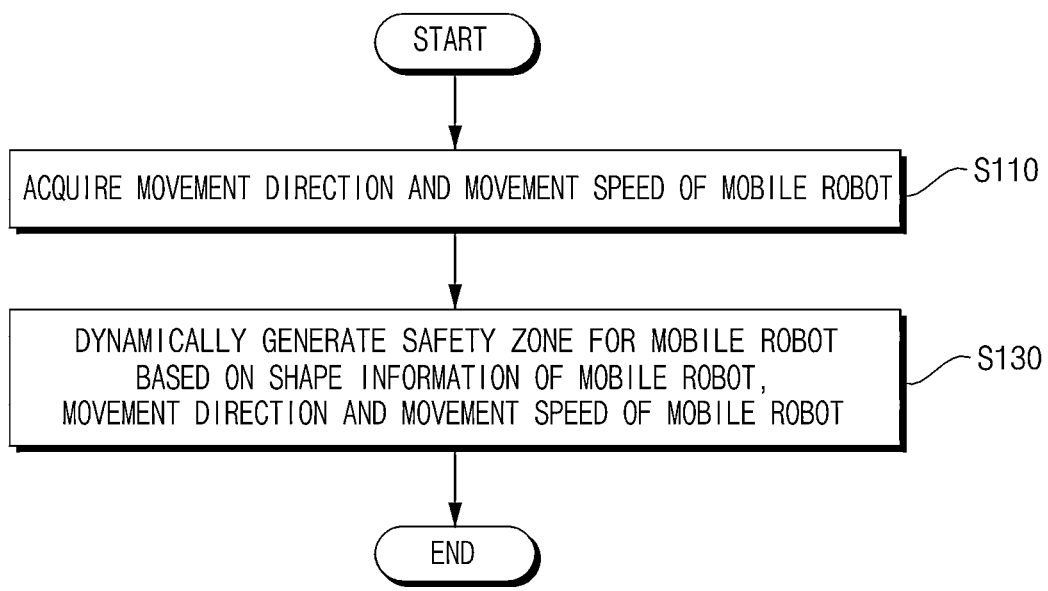
FIG. 13 is a flowchart for explaining a method for generating a dynamic safety zone of a mobile robot according to an exemplary embodiment of the present disclosure.

FIG. 13 is a flowchart for explaining a method for generating a dynamic safety zone of a mobile robot according to an exemplary embodiment of the present disclosure.

Referring to FIG. 13, the dynamic safety zone generating apparatus 100 acquires a movement direction and a movement speed of the mobile robot (S110).

By doing this, the dynamic safety zone generating apparatus 100 dynamically generates the safety zone for the mobile robot based on at least one of the shape information of the mobile robot, the movement direction of the mobile robot, and the movement speed of the mobile robot (S130).

At this time, the dynamic safety zone generating apparatus 100 dynamically generates the safety zone for the mobile robot in the unit of predetermined cycles. The dynamic safety zone generating apparatus 100 dynamically generates the safety zone of the mobile robot when at least one of the movement direction and the movement speed of the mobile robot changes.

To be more specific, the dynamic safety zone generating apparatus 100 acquires a future predicted location of the mobile robot based on the movement direction and the movement speed of the mobile robot. That is, the dynamic safety zone generating apparatus 100 acquires the movement speed of the x-axis direction and the movement speed of the y-axis direction based on the movement direction and the movement speed of the mobile robot, acquires the future predicted x-axis location of the mobile robot based on the movement speed of the x-axis direction and acquires the future predicted y-axis location of the mobile robot based on the movement speed of the y-axis direction, and acquires a future predicted location of the mobile robot based on the future predicted x-axis location and the future predicted y-axis location.

The dynamic safety zone generating apparatus 100 may dynamically generate a safety zone for the mobile robot based on the shape information of the mobile robot and the future predicted location of the mobile robot.

That is, the dynamic safety zone generating apparatus 100 may acquire a default safety zone based on the shape information of the mobile robot and dynamically generate a safety zone for the mobile robot based on the default safety zone and the future predicted location of the mobile robot. At this time, the dynamic safety zone generating apparatus 100 acquires front, rear, left, and right distances with respect to the center point of the mobile robot based on the shape information of the mobile robot and acquires a default safety zone formed of four vertices based on the center point of the robot and the front, rear, left, and right distances.

Further, the dynamic safety zone generating apparatus 100 varies the front, rear, left, and right distances according to the default safety zone based on the future predicted location of the mobile robot to dynamically generate the safety zone for the mobile robot. At this time, the dynamic safety zone generating apparatus 100 acquires a plurality of sub safety zones by varying the front, rear, left, and right distances according to the default safety zone plural times, based on the current location of the mobile robot and the future predicted location of the mobile robot and dynamically generates the safety zone for the mobile robot based on the plurality of sub safety zones.

Figure 14:
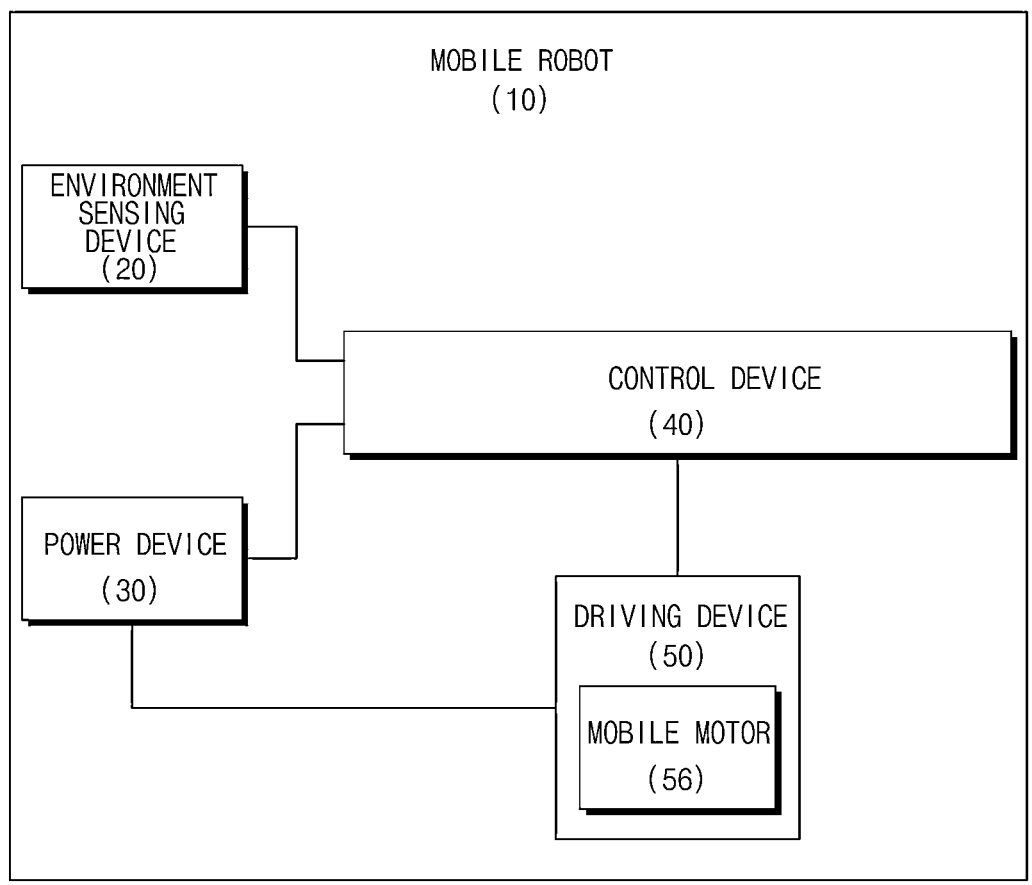
FIG. 14 is a block diagram schematically illustrating a mobile robot according to an exemplary embodiment of the present disclosure.

FIG. 14 is a block diagram schematically illustrating a mobile robot according to an exemplary embodiment of the present disclosure.

A mobile robot 10 according to the exemplary embodiment of the present disclosure includes an environment sensing device 20, a power device 30, a control device 40, and a driving device 50. The mobile robot 10 of FIG. 14 is an example so that all blocks illustrated in FIG. 14 are not essential components and in the other exemplary embodiment, some blocks included in the mobile robot 10 may be added, modified, or omitted.

The mobile robot 10 according to the exemplary embodiment may be household cleaning robots, public building cleaning robots, logistics robots, service robots, and industrial robots.

The environment sensing device 20 refers to a device which senses motion information, surrounding obstacle information, and floor state information for the mobile robot 10.

The environment sensing device 20 includes a plurality of sensors and includes various sensors, such as a LiDAR sensor, a radar sensor, an image sensor, or an IR sensor.

The environment sensing device 20 transmits information sensed by the plurality of sensors to the control device 40.

The power device 30 stores and supplies a power for an operation of the mobile robot 10.

The power device 30 applies a power while interworking with various configurations required to be applied with the power in the mobile robot 10.

The power device 30 may be implemented as a battery, but is not limited thereto.

The control device 40 performs an operation of controlling an overall operation of the mobile robot 10.

The control device 40 controls a safety area for preventing collision of the mobile robot 10. The operation of the control device 40 to generate and control the safety area will be described with reference to FIGS. 15 to 18. Here, the safety area is a concept including a safety zone and the safety zone is replaced with the safety area.

The control device 40 performs an operation corresponding to all or a part of operations performed by the dynamic safety zone generating device 100.

Further, the control device 40 controls the driving of the mobile robot 10. The control device 40 generates an operation control signal based on the safety area and transmits the generated operation control signal to at least one motor included in the driving device 50 to control a driving force of the motor, thereby controlling the operation of the mobile robot 10.

The driving device 50 refers to a device including at least one motor equipped in the mobile robot 10. The driving device 50 may include various types of motors related to the operation of the mobile robot 10.

The driving device 50 according to the exemplary embodiment may include a movement motor 56, but is not necessarily limited thereto and may further include various motors according to the type of the mobile robot 10.

The movement motor 56 is a motor for rotating main wheels (not illustrated) of the mobile robot 10 and is connected to the main wheels (not illustrated) and generates a driving force to rotate the main wheels (not illustrated).

The movement motor 56 rotates the main wheels (not illustrated) to move the mobile robot 10 along the movement path set by the control device 32 of the mobile robot 10.

Further, the movement motor 56 adaptively adjusts a driving force to rotate the main wheels so as to correspond to a movement speed or a size of the safety area based on the operation control signal received from the control device 32.

Figure 15:
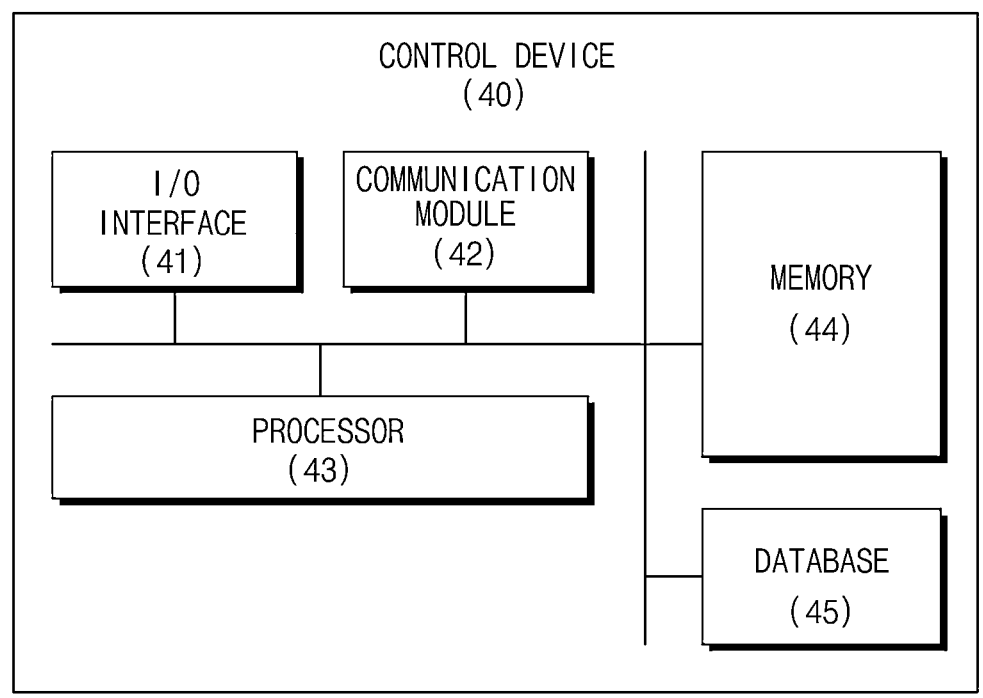
FIG. 15 is a block diagram schematically illustrating a control device of a mobile robot according to an exemplary embodiment of the present disclosure.

FIG. 15 is a block diagram schematically illustrating a control device of a mobile robot according to an exemplary embodiment of the present disclosure.

The control device 40 of the mobile robot 10 according to the exemplary embodiment includes an I/O interface 41, a communication module 42, a processor 43, a memory 44, and a database 45. The control device 40 of FIG. 15 is an example so that all blocks illustrated in FIG. 15 are not essential components and in the other exemplary embodiment, some blocks included in the control device 40 may be added, modified, or omitted. In the meantime, the control device 40 may be implemented by a computing device and each component included in the control device 40 may be implemented by a separate software device or a separate hardware device in which the software is combined.

The communication module 42 refers to a means which receives or transmits a signal or data.

The communication module 42 interworks with the processor 43 to input various types of signals or data or directly acquires data by interworking with a device in the mobile robot or an external device to transmit the signal or data to the processor 43. Here, the communication module 42 performs an operation corresponding to all or part of the operation performed by the information acquiring unit 110.

Further, the communication module 42 transmits the signal or data generated in the processor 43 to the device in the mobile robot 10 or an external device (for example, a server).

The communication module 42 may be connected to the I/O interface 41. The I/O interface 41 transmits information acquired from the communication module 42 to the processor 43 or receives a control signal from the processor 43 to substantially convert the information or the control signal into a signal for controlling the communication module 42.

The processor 43 according to the exemplary embodiment performs an operation of generating and controlling a safety area 2000 for preventing the collision with the obstacle present around the mobile robot 10.

The processor 43 performs an operation corresponding to all or a part of an operation performed by the dynamic safety zone generating unit 130.

The memory 44 includes at least one instruction or program which is executable by the processor 43. The memory 44 includes instructions or programs for controlling the mobile robot 10.

The database 45 refers to a general data structure implemented in a storage space (a hard disk or a memory) of a computer system using a database management program (DBMS) and means a data storage format which freely searches (extracts), deletes, edits, or adds data.

The database 150 may be implemented according to the object of the exemplary embodiment of the present disclosure using a relational database management system (RDBMS) such as Oracle, Informix, Sybase, or DB2, an object oriented database management system (OODBMS) such as Gemston, Orion, or O2, and XML native database such as Excelon, Tamino, Sekaiju and has an appropriate field or elements to achieve its own function. In the meantime, the database 45 may be implemented as a cloud or a virtual memory.

The database 45 according to the exemplary embodiment stores and provides information about control of the mobile robot 10 and information about the safety area.

It has been described that the database 45 is implemented in the control device 40, but is not necessarily limited thereto and may be implemented as a separate data storage device.

Figure 16:
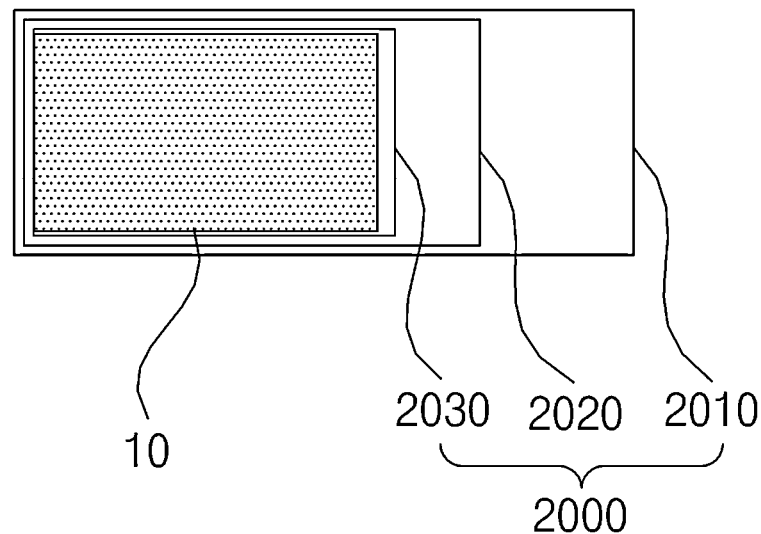
FIGS. 16 and 17 are views for explaining a safety area according to an exemplary embodiment of the present disclosure.
Figure 17:
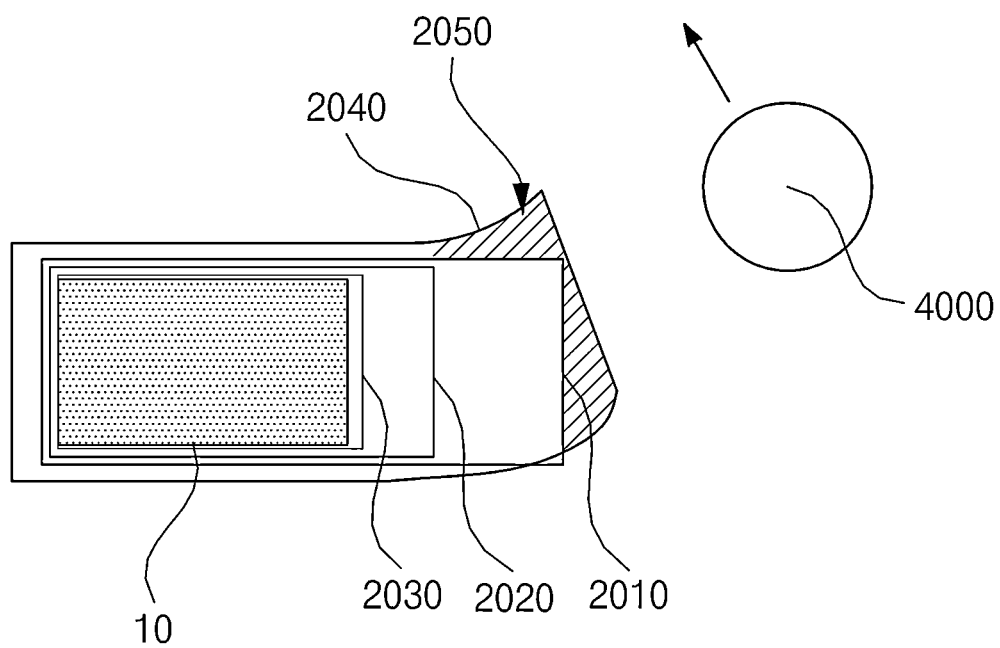

Hereinafter, an operation of generating and controlling a safety area by the processor 43 will be described. FIGS. 16 and 17 are views for explaining a safety area according to an exemplary embodiment of the present disclosure.

According to the exemplary embodiment, the processor 43 generates a safety area 2000 for preventing the collision with the obstacle present around the mobile robot 10. The safety area 2000 generated around the mobile robot 10 includes a plurality of sub safety areas 2010, 2020, 2030.

A speed range required by each sub safety area is different and is defined so as not to overlap.

The sub safety areas are distinguished according to a range of deceleration speed required for every sub safety area. A deceleration range required by a first sub safety area 2010, that is, a required speed range is set so as not to overlap a deceleration range required by a second sub safety area 2020. A third sub safety area 2030 corresponds to an area in which a collision is imminent and a speed region required by the third sub safety area is set so as not to overlap the deceleration range required by the second sub safety area 2020.

For example, the first speed range required by the first sub safety area 2010 does not overlap the second speed range required by the second sub safety area 2020, but is set to be higher than the second speed range. The third speed range required by the third sub safety area 2030 is set to be lower than the second speed range. If the third deceleration range is in contact with a surface of the body of the mobile robot 10, the third speed range substantially includes 0.

The processor 43 performs the processing for visualizing real-time information related to the above-described safety area. The visualized information may be provided to the user by means of a user, a screen of a user terminal, or a screen of the mobile robot 10.

The processor 43 includes a model which generates a safety area including a plurality of sub safety areas 2010, 2020, and 2030 and generates a control variable for setting or managing an attribute (for example, a size, a shape, or a direction) of safety areas according to circumstances. The processor 43 receives the control variable from the safety area generating model to process the visualization for the safety area. According to still another exemplary embodiment, the safety area generating model may be implemented to directly process the visualization for the safety area.

In the processor 43 according to the present disclosure, the safety area may include a fixed safety area in which the attributes (for example, a size, a shape, and a direction) of the safety areas are not changed and a variable safety area in which at least one of the attributes (for example, a size, a shape, and a direction) of the safety areas is changed.

The variable safety area may be separately generated from the fixed safety area and or varies the fixed safety area for a predetermined time (when an obstacle is sensed on the traveling path or there is a collision possibility).

The variable safety area is desirably a safety area which is generated in response to a dynamic obstacle or an unidentified static obstacle.

As described above, each of the fixed safety area and the variable safety area may further include sub safety areas.

The processor 43 according to the exemplary embodiment finally determines the attribute (size, shape, or location) of the variable safety area in consideration of motion information of the mobile robot or environment information acquired from the sensor. Here, the motion information may be a movement speed or a movement direction of the mobile robot and the environment information may be neighbor sensing information or obstacle detection information.

The processor 43 generates the variable safety area independently from the fixed safety area to determine an attribute (for example, size, shape, or direction) of the variable safety area in consideration of the motion information of the mobile robot and the environment information. When an unidentified static obstacle or a dynamic obstacle is sensed on the traveling path, the variable safety area which is generated in consideration of a distance to the obstacle may further include detailed variable sub safety areas.

In the meantime, the fixed safety area and the variable safety area may be generated to have different attributes by the unidentified static obstacle or the dynamic obstacle 4000 which approaches the mobile robot to be sensed. That is, the fixed safety area and the variable safety area 2040 are substantially different so that there are an overlapped region in which two areas overlap and a non-overlapped region 2050 which belongs to only one safety area.

Figure 18:
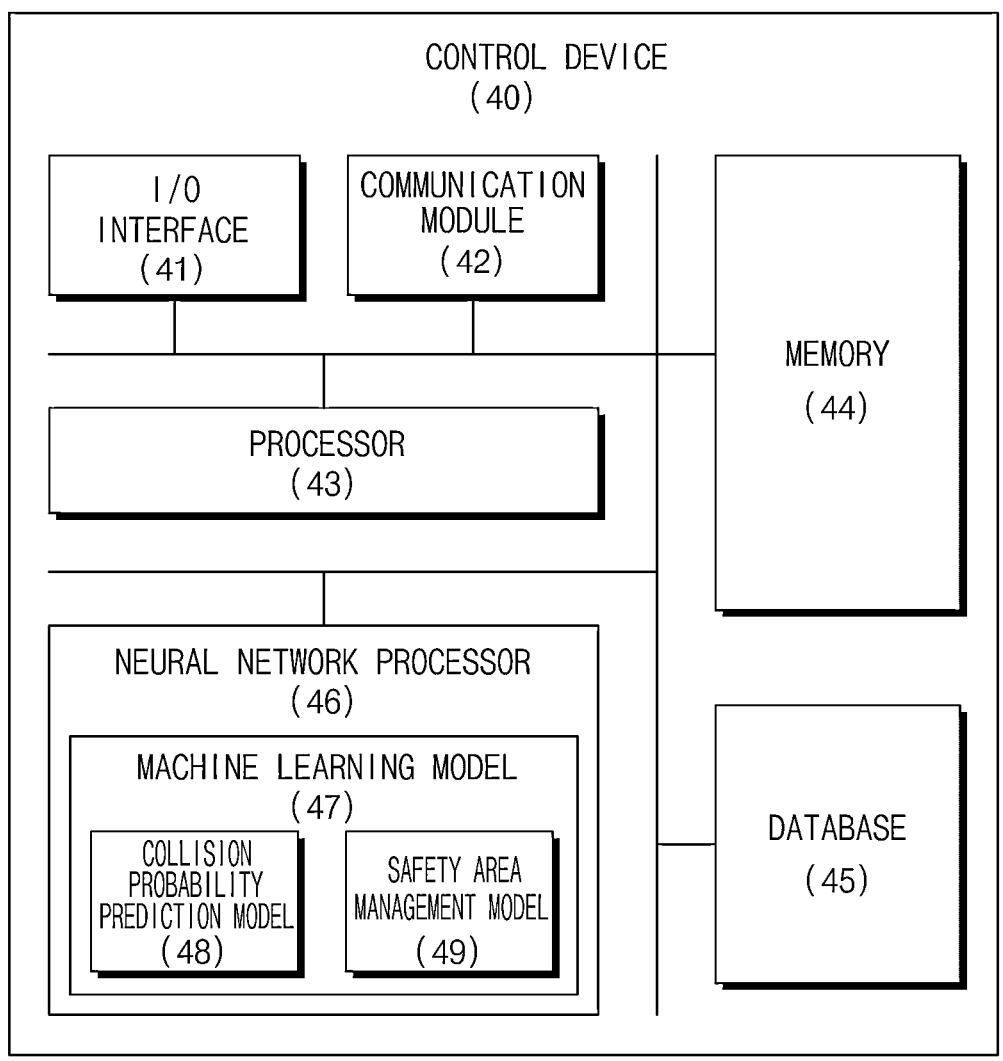
FIG. 18 is a block diagram schematically illustrating a control device including a machine learning model according to an exemplary embodiment of the present disclosure.

FIG. 18 is a block diagram schematically illustrating a control device including a machine learning model according to an exemplary embodiment of the present disclosure.

The control device 40 of FIG. 18 is an example in which a neural network processor 46 is added to the control device 40 of FIG. 15. Therefore, a redundant description with the control device 40 of FIG. 15 will be omitted.

The memory 44 includes at least one instruction or program which is executable by the processor 43. The memory 44 includes instructions or programs for controlling the mobile robot 10. Further, the memory 44 includes an instruction or a program for an operation of preprocessing a neural network learning result and an input value or an output value of the neural network.

The control device 40 of the exemplary embodiment further includes a neural network processor 46 including a machine learning model 47 which is trained in advance to improve a processing speed and an accuracy related to the safety area.

The processor 43 may interwork with the neural network processor 46 to perform an operation of controlling a safety area.

In the meantime, even though it is described that the processor 43 and the neural network processor 46 are different modules, the present invention is not necessarily limited thereto and the processor and the neural network are combined as one module to perform the individual operations.

The neural network processor 46 performs an operation of predicting a collision probability based on artificial intelligence (AI) or managing a safety area.

The neural network processor 46 includes an input node, an intermediate node, and an output node and has a structure specified by a determination weight in which training is completed in advance by training data as a connection weight which connects the nodes. An output value of the neural network processor 46 may be a coordinate value of an extended area or a coordinate value of a unit block area and may be implemented as a feature value matrix for the extended area or the unit block area.

The machine learning model 47 includes a collision probability prediction model 48 which predicts the collision with an obstacle and a safety area management model 49 which manages the safety area.

First, the collision probability prediction model 48 is a model which generates collision prediction information related to the collision with obstacles on a traveling path which is currently predicted. The collision probability prediction model is a machine learning model which is trained by various training data and may be implemented as software or hardware.

The collision probability prediction model 48 outputs information related to the collision with a sensor value as an input. A structure of the neural network for the collision probability prediction model 48 is not specifically limited. For example, the neural network may be implemented as a convolution neural network with a multi-layered neural network structure or recurrent neural network. Further, it may be implemented as hardware using an artificial intelligence accelerator.

The safety area management model 49 inputs information about the safety area visualized by the processor 43 to a previously trained neural network to output sub area attribute values for every sub area belonging to the visualized area. Here, the sub area attribute value includes information indicating a safety area or a sub safety area to which micro areas defined for every pixel or for every macro block configured by a plurality of pixels.

The safety area management model 49 desirably has a convolution neural network type neural network structure, but is not necessarily limited thereto. Further, it may be implemented as hardware using a graphic accelerator model.

The processor 43 finally determines an attribute (size, shape, location) of the variable safety area in consideration of motion information of the mobile robot, environment information acquired from the sensor, or collision prediction information for collision possibility between the mobile robot and the obstacle transmitted from the collision probability prediction model 48. Here, the motion information may be a movement speed or a movement direction of the mobile robot and the environment information may be neighbor sensing information or obstacle detection information. Further, the collision prediction information includes a collision probability, a remaining time to collide, or a collision prediction location when the mobile robot moves along the predicted movement path. The collision prediction point may be, for example, a body left, a body right, or a front of the mobile robot.

The processor 43 generates the variable safety area independently from the fixed safety area to determine an attribute (for example, size, shape, or direction) of the variable safety area in consideration of the motion information of the mobile robot, the environment information, and the collision prediction information. When an unidentified static obstacle or a dynamic obstacle is sensed on the traveling path, the variable safety area which is generated in consideration of a distance to the obstacle may further include detailed variable sub safety areas.

In the meantime, the fixed safety area and the variable safety area may be generated to have different attributes by the unidentified static obstacle or the dynamic obstacle 4000 which approaches the mobile robot to be sensed. That is, the fixed safety area 2010 and the variable safety area 2040 are substantially different so that there are an overlapped region in which two areas overlap and a non-overlapped region 2050 which belongs to only one safety area.

Referring to FIG. 17, the non-overlapped area 2050 is generated by an obstacle 400 which is suddenly sensed or an obstacle 4000 nearby. The non-overlapped region 2050 is an area located at the outside of the "variable safety area". The safety area management model 49 transmits a sub area attribute value for the overlapped region 2050 to the processor 43.

The processor 43 calculates the traveling path again using the sub area attribute value. The processor 43 allows the mobile robot to travel along the calculated traveling path.

Further, as illustrated in FIG. 17, when a dynamic obstacle or an unidentified static obstacle 4000 is sensed at the left side of the left traveling direction, the processor 43 receives the collision prediction information from the collision probability prediction model 48 and generates a variable safety area 2040 in which the safety area varies according to the location in which the sensed obstacle is located. When the sensed dynamic obstacle or unidentified static obstacle 4000 approaches within a predetermined reference, the processor 43 extends the safety area toward the direction in which the dynamic obstacle is located to generate an extended variable safety area 2040.

The mobile robot 10 includes a variable safety area having a shape with a curvature or an arc shape.

As the variable safety area is applied, the mobile robot 10 supplements a traffic line of the mobile robot 10 which is wasted in a polygonal safety area with respect to the static obstacle. Further, as the variable safety area is applied, the mobile robot 10 covers a missing area in the polygonal safety area with respect to the static obstacle to supplement the safety area.

In other words, as the variable safety area having a shape with a curvature or an arc shape is applied, the mobile robot 10 may ensure a safety area based moving path which minimizes a space loss.

Figure 19:
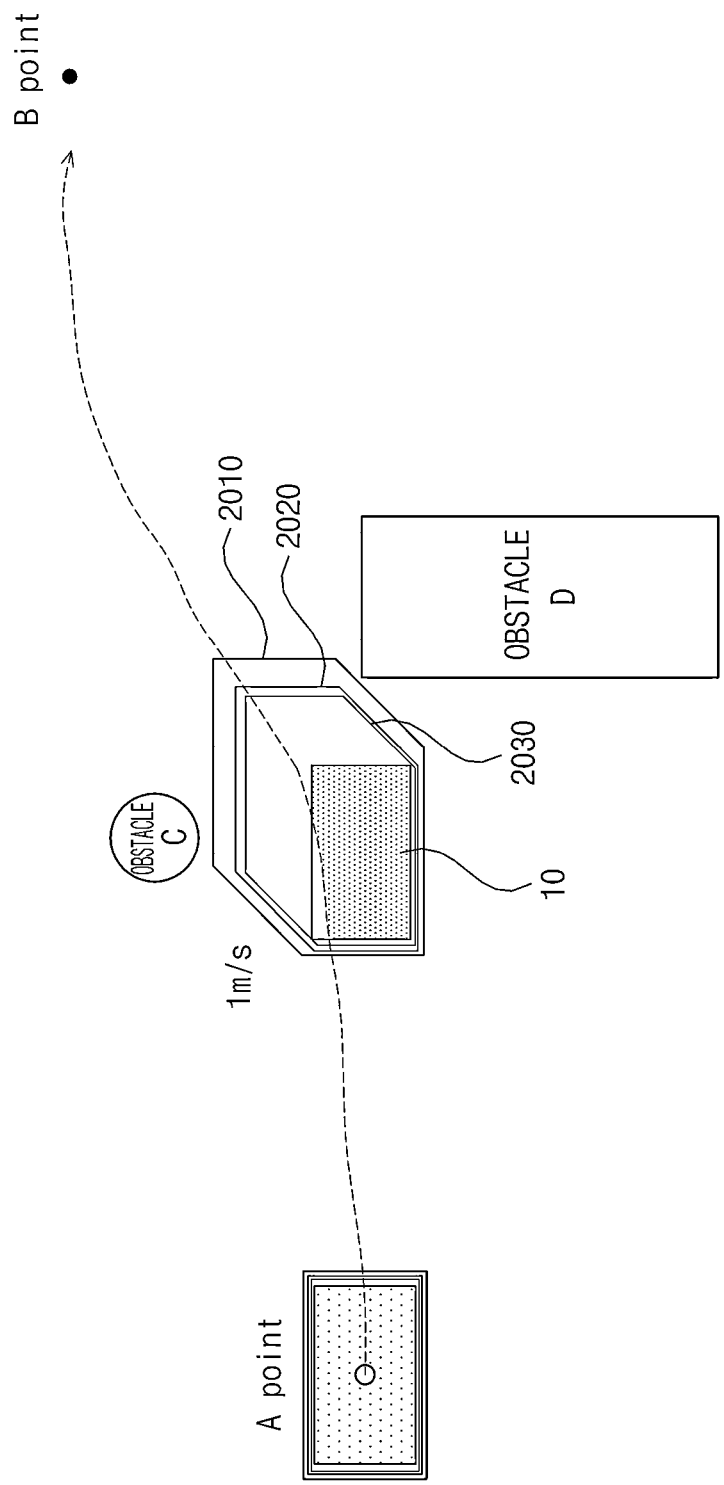
FIGS. 19 and 20 are exemplary views for explaining an operation of a mobile robot according to an obstacle according to an exemplary embodiment of the present disclosure.
Figure 20:
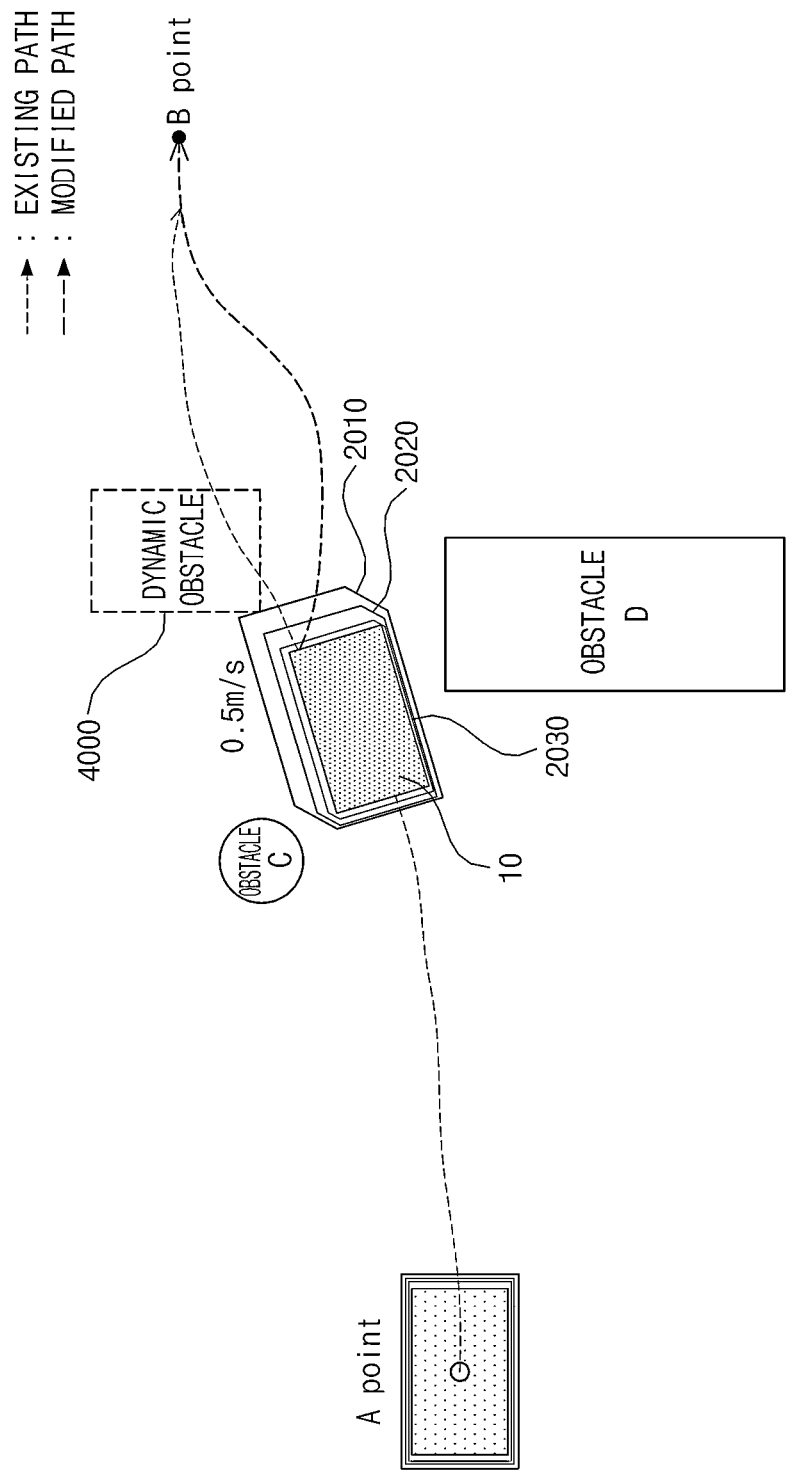

FIGS. 19 and 20 are exemplary views for explaining an operation of a mobile robot according to an obstacle according to an exemplary embodiment of the present disclosure.

FIG. 19 illustrates a situation in which when the mobile robot 10 moves from a start point A to an arrival point B, there are static obstacles C and D and FIG. 20 illustrates a situation in which when the mobile robot 10 moves from a start point A to an arrival point B, there are static obstacles C and D and a dynamic obstacle or an unidentified static obstacle 4000.

In FIG. 19, the mobile robot 10 extends the sub safety areas 2010, 2020, and 2030 to cover between the static obstacles C and D and moves while reducing a movement speed in accordance with the extension.

In FIG. 19, the sub safety areas 2010, 2020, and 2030 are formed as variable safety areas having a shape with a curvature or an arc shape.

As the sub safety areas 2010, 2020, and 2030 having a shape with a curvature or an arc shape are applied, the traffic line of the mobile robot which is wasted in the polygonal safety area with respect to the static obstacle is supplemented and the area which is missed in the vicinity of the static obstacle is covered to supplement the safety area.

In the meantime, in FIG. 20, when the dynamic obstacle or the unidentified static obstacle 4000 which is in contact with the first sub safety area 2010 is sensed, the mobile robot 10 reduces the movement speed based on a predetermined deceleration range for the first sub safety area 2010 and modifies a traveling path of the mobile robot 10. Here, the modified traveling path may be set to a shortest distance to reach the arrival point B while avoiding the dynamic obstacle or the unidentified static obstacle 4000.

When the mobile robot 10 avoids the dynamic obstacle or the unidentified obstacle 4000, the mobile robot 10 move while maintaining a predetermined distance to the obstacle 4000.

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The recording media of the computer program may include a magnetic recording medium or an optical recording medium.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protective scope of the present disclosure should be construed based on the following claims, and all the technical concepts in the equivalent scope thereof should be construed as falling within the scope of the present disclosure.

What is claimed is:

1. A dynamic safety zone generating apparatus loaded in a mobile robot and configured to dynamically generate a safety zone based on information acquired from a sensor mounted on the mobile robot, comprising:
    an information acquiring circuit which acquires a movement direction and a movement speed of a mobile robot; and
    a safety zone generating circuit which dynamically generates a safety zone for the mobile robot based on at least one of shape information of the mobile robot, a movement direction of the mobile robot acquired by the information acquiring circuit, and a movement speed of the mobile robot acquired by the information acquiring circuit,
    wherein the safety zone generating circuit acquires a future predicted x-axis location of the mobile robot by multiplying a movement speed of the x-axis direction of the mobile robot by a sum of a braking distance required to stop the mobile robot which is preset according to the speed of the mobile robot, a margin distance preset for the safety of the mobile robot, and a response time of a sensor mounted on the mobile robot,
    acquires a future predicted y-axis location of the mobile robot by multiplying a movement speed of the y-axis direction of the mobile robot by the sum of the braking distance, the margin distance, and the response time,
    acquires a future predicted location of the mobile robot based on the future predicted x-axis location and the future predicted y-axis location,
    dynamically generates the safety zone for the mobile robot based on the shape information of the mobile robot and the future predicted location of the mobile robot,
    generates an operational control signal based on the safety zone, and
    transmits the operation control signal to at least one motor to control the operation of the mobile robot.

2. The dynamic safety zone generating apparatus according to claim 1, wherein the safety zone generating circuit acquires a default safety zone based on the shape information of the mobile robot and dynamically generates a safety zone for the mobile robot based on the default safety zone and the future predicted location of the mobile robot.

3. The dynamic safety zone generating apparatus according to claim 2, wherein the safety zone generating circuit acquires front, rear, left, and right distances with respect to a center point of the mobile robot based on the shape information of the mobile robot and acquires a default safety zone formed of four vertices based on the center point of the robot and the front, rear, left, and right distances.

4. The dynamic safety zone generating apparatus according to claim 2, wherein the safety zone generating circuit varies the front, rear, left, and right distances according to the default safety zone based on the future predicted location of the mobile robot to dynamically generate the safety zone for the mobile robot.

5. The dynamic safety zone generating apparatus according to claim 4, wherein the safety zone generating circuit acquires a plurality of sub safety zones by varying the front, rear, left, and right distances according to the default safety zone plural times, based on the current location of the mobile robot and the future predicted location of the mobile robot and dynamically generates the safety zone for the mobile robot based on the plurality of sub safety zones.

6. The dynamic safety zone generating apparatus according to claim 1, wherein the safety zone generating circuit dynamically generates a safety zone for the mobile robot in the circuit of a predetermined cycle.

7. The dynamic safety zone generating apparatus according to claim 1, wherein the movement direction of the mobile robot is one of a traveling direction according to a straight movement of the mobile robot, a traveling direction according to the rotation of the mobile robot, and a traveling direction when the rotation and the straight movement of the mobile robot are simultaneously generated, the straight movement of the mobile robot is one of a straight movement on the x-axis, a straight movement on the y-axis, and a diagonal movement on the x-axis and the y-axis, and the rotation of the mobile robot is one of the rotational movement to the left side and the rotational movement to the right side.

8. The dynamic safety zone generating apparatus according to claim 1, wherein the safety zone generating circuit generates the safety zone including a plurality of sub safety areas and speed ranges of a mobile robot required by the sub safety areas are different from each other.

9. The dynamic safety zone generating apparatus according to claim 8, wherein the plurality of sub safety areas includes a first sub safety area, a second sub safety area, and a third sub safety area and a first speed range required by the first sub safety area does not overlap a second speed range required by the second sub safety area and is set to be higher than the second speed range.

10. The dynamic safety zone generating apparatus according to claim 9, wherein a third speed range required by the third sub safety area is set to be smaller than the second speed range and when the third sub safety area is in contact with a surface of a body of the mobile robot, the third speed range includes a speed value of 0.

11. The dynamic safety zone generating apparatus according to claim 1, wherein the safety zone generating circuit includes a processor and further includes a neural network processor including a machine learning model which predicts a collision with an obstacle and manages the safety area.

12. The dynamic safety zone generating apparatus according to claim 11, wherein the processor finally determines an attribute (size, shape, location) of the safety area in consideration of motion information of the mobile robot, environment information acquired from the sensor, or collision prediction information for collision possibility between the mobile robot and the obstacle transmitted from the collision probability prediction model.

13. A dynamic safety zone generating method performed in a mobile robot and configured to dynamically generate a safety zone based on information acquired from a sensor mounted on the mobile robot, comprising:

acquiring a movement direction and a movement speed of a mobile robot; and dynamically generating a safety zone for the mobile robot based on at least one of shape information of the mobile robot, a movement direction of the mobile robot, and a movement speed of the mobile robot, wherein the dynamically generating of a safety zone acquires a future predicted x-axis location of the mobile robot by multiplying a movement speed of the x-axis direction of the mobile robot by a sum of a braking distance required to stop the mobile robot which is preset according to the speed of the mobile robot, a margin distance preset for the safety of the mobile robot, and a response time of a sensor mounted on the mobile robot, acquires a future predicted y-axis location of the mobile robot by multiplying a movement speed of the y-axis direction of the mobile robot by the sum of the braking distance, the margin distance, and the response time, acquires a future predicted location of the mobile robot based on the future predicted x-axis location and the future predicted y-axis location, dynamically generates the safety zone for the mobile robot based on the shape information of the mobile robot and the future predicted location of the mobile robot, generates an operational control signal based on the safety zone, and transmits the operation control signal to at least one motor to control the operation of the mobile robot.

14. The dynamic safety zone generating method according to claim 13, wherein the dynamically generating of a safety zone is configured by acquiring a default safety zone based on the shape information of the mobile robot and dynamically generating a safety zone for the mobile robot based on the default safety zone and the future predicted location of the mobile robot.

* * * * *